(No Model.)
S. W. DANA.
DREDGE WINDER.
No. 253,012.  Patented Jan. 31, 1882.
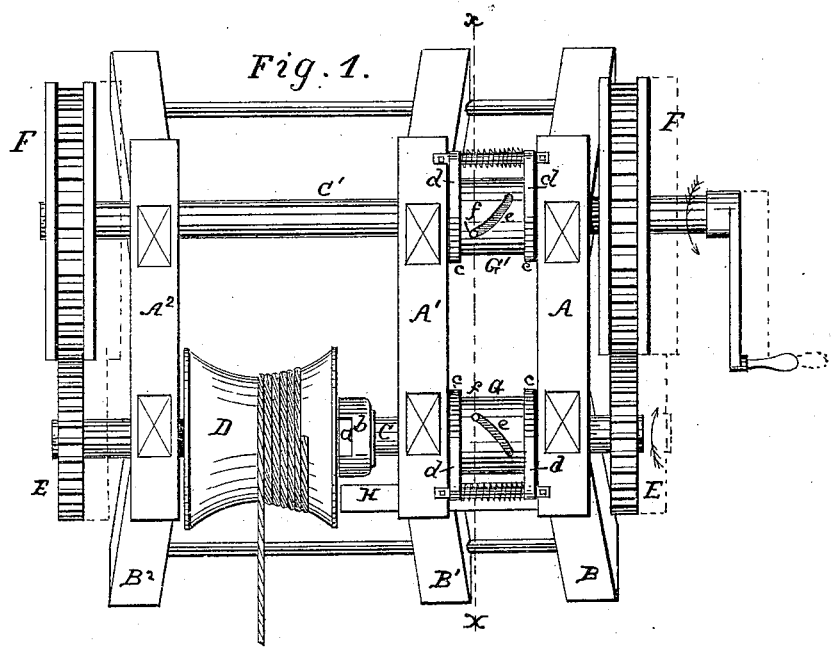
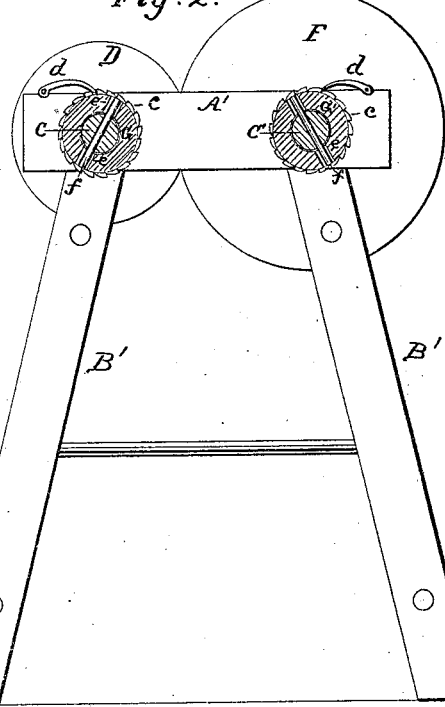
WITNESSES:
Thos Houghton.
Edw. W. Byrn.
INVENTOR:
S. W. Dana
BY
ATTORNEYS.

UNITED STATES PATENT OFFICE.

SUMNER W. DANA, OF CRISFIELD, MARYLAND.

DREDGE-WINDER.

SPECIFICATION forming part of Letters Patent No. 253,012, dated January 31, 1882.

Application filed June 29, 1881. (No model.)

*To all whom it may concern:*

Be it known that I, S. W. DANA, of Crisfield, in the county of Somerset and State of Maryland, have invented a new and Improved Dredge-Winder; and I do hereby declare that the following is a full, clear, and exact description of the same, reference being had to the accompanying drawings, forming part of this specification, in which—

Figure 1 is a plan view, and Fig. 2 a vertical section through the line $x\ x$.

My invention relates to certain improvements in oyster-dredge winders.

In gathering oysters from the bottom of the river by dredges the dredges are dragged along the bottom by the headway of the vessel, and if any obstruction be met with a violent back movement is produced at the windlass, which is likely to injure or kill the men at the cranks.

My invention relates to certain improvements upon that form of dredge-winder in which a rotary shaft bearing a clutch moves the latter longitudinally away from the winding-drum (whenever a back strain occurs) by the engagement of a pin on said shaft with a cam-slot in a sleeve encircling said shaft and held rigid by a pawl; and my improvement consists in the peculiar construction and arrangement of parts hereinafter fully described, and pointed out in the claims.

In the drawings, A A' A² represent three horizontal beams mounted upon legs B B' B², and constituting therewith the supporting-frame of the winder.

C C' are two horizontal and parallel shafts arranged in bearings on the top of said frame. One of these shafts, C, carries a loose spool or winding-drum, D, having at one end clutch-lugs $a$. This spool may revolve loosely on the shaft or may be rigidly connected to it by a clutch, $b$, fastened to the shaft and adapted to engage with the lugs $a$ of the spool. The shaft C has at each of its opposite ends a small gear-wheel, E, which wheels mesh with larger gear-wheels F on the parallel shaft C'. This second shaft C' and its larger gear-wheels F is simply used for gaining power, and it is provided at one end with a crank for turning it. The wheels F have also peculiarly-shaped teeth—*i. e.*, instead of having projecting teeth the teeth are formed of recesses sunk into the periphery of the wheel, so that the teeth of the middle gear-wheels, E, cannot get out of mesh with the teeth of the larger wheels by any lateral movement of the wheel incident to the endwise motion of the shaft which I utilize to release the clutch.

Now, for securing the automatic release of the winding-spool from the shaft when an undue strain comes upon it, I place between the beam A A' a sleeve, G, having at its ends ratchet-wheels $c\ c$ formed thereon, which are engaged by the two pawls $d\ d$ to resist back movement. In the opposite sides of this sleeve and between the two ratchet-wheels are formed reversely-inclined slots $e\ e$, and in these slots lie the projecting ends of a pin, $f$, passing through and rigidly connected to the shaft. Now the spool is held between the beam A² and an abutting part, H, attached to the frame. The shafts C C' and their wheels, however, slide longitudinally in their bearings. When the dredge-rope is to be wound up on the spool the shafts C C' are so adjusted as to throw the clutch $b$ into engagement with the lugs $a$ on the end of the spool, and then the rotation of the shafts through the crank causes the spool also to rotate with the shaft and wind up said rope. When, however, an unusual strain is put upon the dredge-rope by the dredge striking an obstacle under water the spool starts to rotate backward. The pawls $d\ d$ then engage the ratchet-teeth on the sleeve to prevent it from turning backward, and the pin $f$ in the shaft, in turning with the shaft, traverses the inclined slots $e\ e$, which, acting like cams, serve to draw the shaft C endwise and remove the clutch $b$ from its engagement with the spool or drum, and allows this to run freely on the shaft backward to unwind the rope.

As shown in the drawings, I employ two shafts, so as to gain power, and I place upon the second shaft a sleeve, G', with ratchet-teeth, pawls, slots, and pin corresponding to G, both of which act in unison to throw the two shafts endwise. In making use of my invention, however, I do not confine myself to the use of this second shaft with its corresponding devices, as in some cases the crank will be placed directly on the end of the spool-shaft.

I am aware of the fact that a sleeve having a diagonal cam-slot with ratchet-teeth at one end has heretofore been combined with a longitudinally-moving shaft in a dredge-winder. When the strain comes upon such a sleeve, however, the torsional action is liable to twist the ratchet-teeth, so as to involve a liability of dislodging the pawl from said teeth or stripping the latter. By making the sleeve with ratchets at each end the sleeve is held rigidly, and the result just described is entirely avoided.

Having thus described my invention, what I claim as new is—

1. The sleeve G, having diagonal slots e in the same, and ratchet-teeth c c at each end of said sleeve, in combination with the two pawls d d, the frames A A', holding the sleeve against longitudinal movement, and the sliding shaft bearing a clutch and passing through the sleeve, and having a pin, f, passing through the slots e, substantially as shown and described.

2. The combination of the two longitudinally-adjustable shafts connected at their opposite ends by gear-wheels E F, one of which has projecting and the other indented teeth, the two sleeves G G', having slots f and ratchet-teeth c c at each end, the pawls d d, the frames A A' A², the clutch b, and the winding-drum D, as shown and described.

SUMNER WOLCOTT DANA.

Witnesses:
L. E. P. DENNIS,
O. S. HORSEY.